Oct. 26, 1954 J. D. REID 2,692,943

DECITUNED TRANSCEIVER

Filed Dec. 16, 1950 2 Sheets-Sheet 1

Inventor:
John D. Reid
By: Alden D. Redfield
Attorney.

DECITUNED TRANSCEIVER

Filed Dec. 16, 1950 2 Sheets-Sheet 2

Inventor:
John D. Reid
By: Alden D. Redfield
Attorney.

Patented Oct. 26, 1954

2,692,943

UNITED STATES PATENT OFFICE 2,692,943

DECITUNED TRANSCEIVER

John Drysdale Reid, Little Rock, Ark., assignor to Avco Manufacturing Corporation, Cincinnati, Ohio, a corporation of Delaware Application December 16, 1950, Serial No. 201,177

1 Claim. (Cl. 250—13)

The present invention relates to a push-button decituned transceiver for rapidly and accurately covering a large number of transmission channels with a minimum of control or adjustment elements.

In certain instances it would be desirable to provide a combined transmitting and receiving equipment which could be tuned rapidly and accurately to a selected one of a relatively large number of communication channels. To provide a compact apparatus it would be desirable to provide an arrangement whereby some of the elements are used for both transmitting and receiving purposes. In order to illustrate a possible embodiment of a device of this kind, it may be assumed that it is desired to utilize a large number of channels separated by suitable intervals such as ten kilocycles. By utilizing the present invention it would be possible to provide rapid accurate selection of a desired channel for either transmission or reception and to cover the range of $n$ hundred channels with $20+n$ push buttons.

It is, therefore, an object of the present invention to provide a transceiver having transmitting tubes and receiving tubes controlled by a minimum number of switches.

Another object of the present invention is to provide a transceiver having transmitting and receiving tubes arranged for rapid switching to either transmitting or receiving purposes.

Still another object of the present invention is to provide a transceiver having a plurality of components utilized for both transmitting and receiving functions.

A still further object of the invention is to provide a transceiver for a large number of channels covering a continuous range over a wide band of frequencies.

Still another object of the present invention is to provide a transceiver having a common means for producing automatic gain control potentials for both modes of operation.

Still another object of the present invention is to provide a transceiver having a minimum number of push-button controls for obtaining $n$ hundred channels with $20+n$ push buttons.

Other and further objects of the present invention subsequently will become apparent by reference to the following description taken in conjunction with the accompanying drawings wherein.

Figures 1, 3, 4:
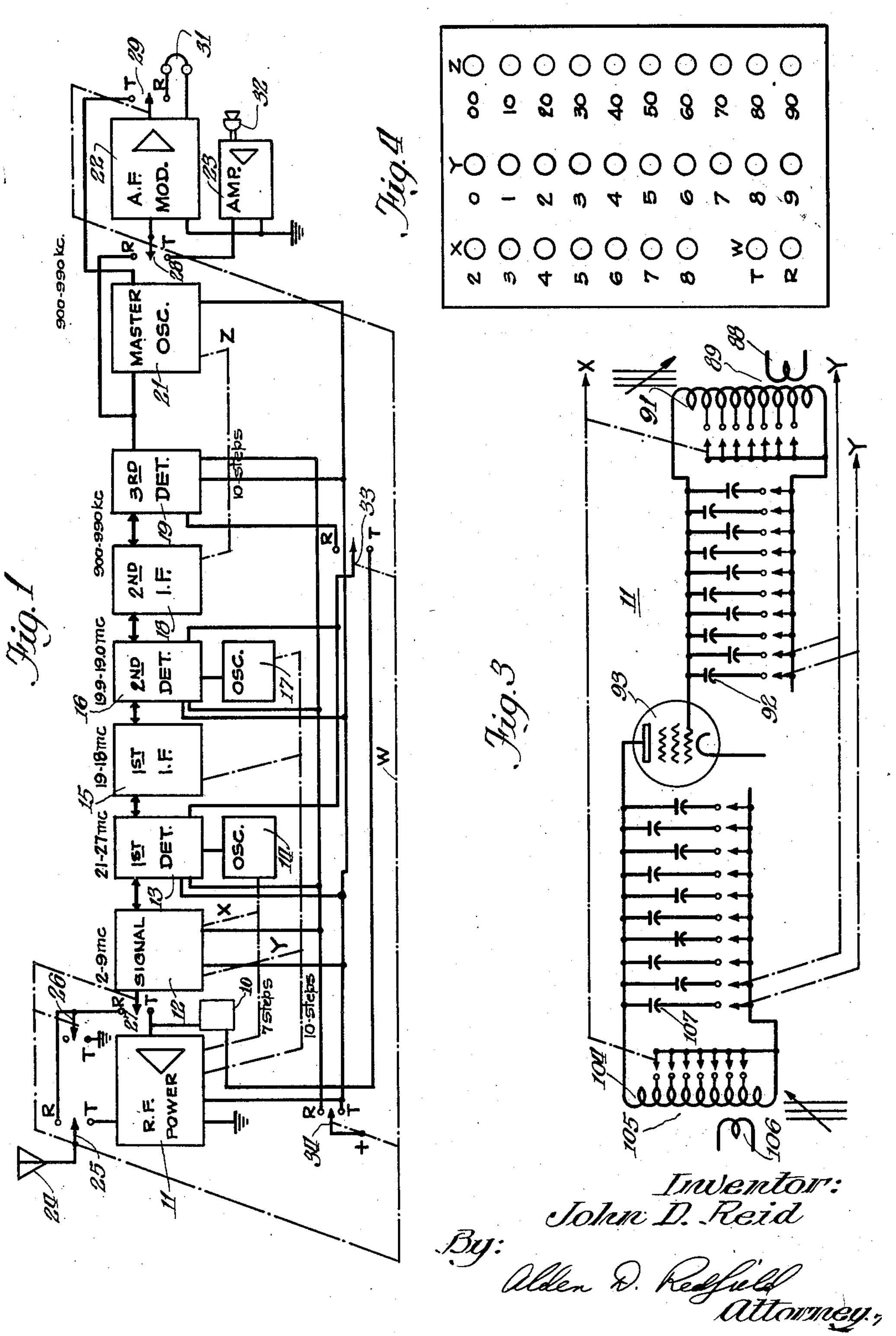
Figure 1 is a block diagram of a transceiver embodying the present invention.
Figure 3 is a detailed circuit diagram of a portion of the transceiver circuit.
Figure 4 is an elevation view of the push buttons provided for selecting the operating frequency or transmission channel and for controlling the direction of transmission.

Referring to Figure 1 of the drawing, there is illustrated in block diagram a transceiver having a radio frequency power amplifier 11 arranged to be selectively connected between an antenna and a signal amplifier 12. The signal amplifier is connected to a heterodyne detector which receives energy from an oscillator 14. The oscillator 14, the signal amplifier 12 and the power amplifier 11 are arranged to be tuned by equal and large increments, for example 1 megacycle steps, over a selected frequency range by means of a single control device. Both the radio frequency power amplifier and the signal amplifier are provided with inductive and capacitive tuning elements, one of which is arranged to be controlled simultaneously as an adjustment whenever the oscillator 14 is adjusted in frequency. The other control element is used for step variation of one-tenth of the order, for example 100 kilocycle steps.

The heterodyne detector 13 is connected to an intermediate frequency amplifier 15, which is connected to a second heterodyne detector 16, which receives energy from an oscillator 17. Both the oscillator 17 and the intermediate frequency amplifier 15 are arranged to be tuned through equal increments of 100 kilocycles at the same time that similar adjustments are made on the signal amplifier 12 and the radio frequency power amplifier 11. Thus, for example, decimal increments of 100 kilocycles in frequency change occur simultaneously in the oscillator 17, the intermediate frequency amplifier 15, the signal amplifier 12 and the radio-frequency power amplifier 11.

The second heterodyne detector or mixer 16 is connected to an intermediate frequency amplifier 18, which in turn is connected to a third heterodyne detector 19. The third detector 19 is connected to a master oscillator 21 and is also connected to one terminal R of a switch 28. The master oscillator 21 and the intermediate frequency amplifier 18 are each arranged to be tuned by equal increments, which comprise ten steps of ten kilocycle separation each.

An audio-frequency modulator 22, which serves as a modulator for transmitting purposes, and as an audio-frequency amplifier for receiving purposes is connected to the movable contact of switch 28. The output of the modulator 22 is connected to the movable contact of a switch 29. The R terminal of the switch 29 is connected to a suitable translating device such as a pair of headphones or loud speaker 31. The T contact of switch 29 is connected to the master oscillator 21. The T contact of the switch 28 is connected to a preamplifier 23 for a microphone 32.

An antenna 24 is connected to the movable contact or switch arm of a switch 25 having a terminal T connected to a radio-frequency power amplifier 11. The other contact R of the switch 25 is connected to the movable arm of the switch blade of a switch 26, which has an open circuit position, and a closed circuit position when it engages a contact T which is connected to ground. The movable contact of the switch 26 is also connected to the contact R of a switch 27. The movable contact of the switch 27 is connected to a signal amplifier 12. The remaining contact T of the switch 27 is connected to the input terminal of the radio-frequency power amplifier 11.

Means are also provided for developing an automatic gain control voltage from signal energy entering the detector or mixer device 19. To illustrate the application of this voltage to a particular purpose the third detector 19 is connected to the contact R of a switch 33. The switch 33 has a switch blade which leads to the grid circuits of the first and second mixers or detectors 13 and 16. The switch 33 has another terminal T, which is connected to a diode detector 10 which receives signal energy from the input to the radio-frequency power amplifier 11. The intermediate frequency amplifiers 15 and 18 are used for both transmission and reception and, accordingly, two sets of tubes are provided in the signal amplifier 12, the first detector 13, the second detector 16 and the third detector 19. By controlling the application of anode potential to a selected group of tubes, the direction of transmission through the signal amplifier and the various intermediate frequency amplifiers is determined. Hence, suitable connections are provided from these elements to a contact R of a switch 34, which has its movable arm connected to a suitable source of anode potential. The switch 34 has another contact T which is connected to the other group of tubes, which serve during the time that the apparatus is used for radio transmission. All of the switches 25, 26, 27, 28, 29, 33 and 34 are arranged to be controlled by a single operation. Thus these switches may be actuated by the selective manipulation of two push buttons T and R to determine whether the apparatus is to be used as a transmitter or a receiver.

To illustrate the manner in which the present apparatus operates it would be convenient to assign definite frequency ranges to various components. Thus it may be assumed that it is desirable to provide ten kilocycle separation for the various channels and hence the master oscillator 21 might be arranged to cover a range from 900 to 990 kilocycles in ten equal steps. The intermediate frequency amplifier 18 likewise covers this same frequency range in ten equal steps, and hence tuning of these elements is accomplished by decimal increments. The oscillator 17 covers a range from 19.9 to 19.0 megacycles in ten equal steps. This energy is mixed with the incoming energy from the amplifying tubes transmitting energy through the intermediate frequency transformer 18 so that the resultant frequencies transmitted through the intermediate frequency amplifier 15 cover a range from 19 to 18 megacycles in ten equal steps. The oscillator 14 is arranged to be tuned in seven equal steps through a range from 21 to 27 megacycles, which when mixed with the incoming frequency from 19 to 18 megacycles is transmitted through the signal amplifier 12, which in seven equal steps covers a range from 2 to 9 megacycles. The oscillator 14 in one embodiment was arranged to be tuned by seven equal steps. Each of these seven steps likewise produced a change in the signal amplifier 12 and the radio-frequency power amplifier 11. Each of these seven steps of the amplifier 11 and the signal amplifier 12 could be tuned by decimal increments since these elements were provided with both inductive and capacitive tuning means, one of which was provided with seven steps of 1 megacycle and the other of which was provided with ten steps of 100 kilocycles. The tuning means having ten steps were connected for unitary control with the tuning means providing decimal incremental changes of 100 kilocycles in the frequencies of the intermediate frequency amplifier 15 and the oscillator 17. Thus as subsequently will become apparent by means of three sets of tuning elements utilizing a total of 27 push buttons, it has been possible to provide for selective operation on any one of 700 channels separated by ten kilocycles in the range of 2 to 7 megacycles.

Figure 2:
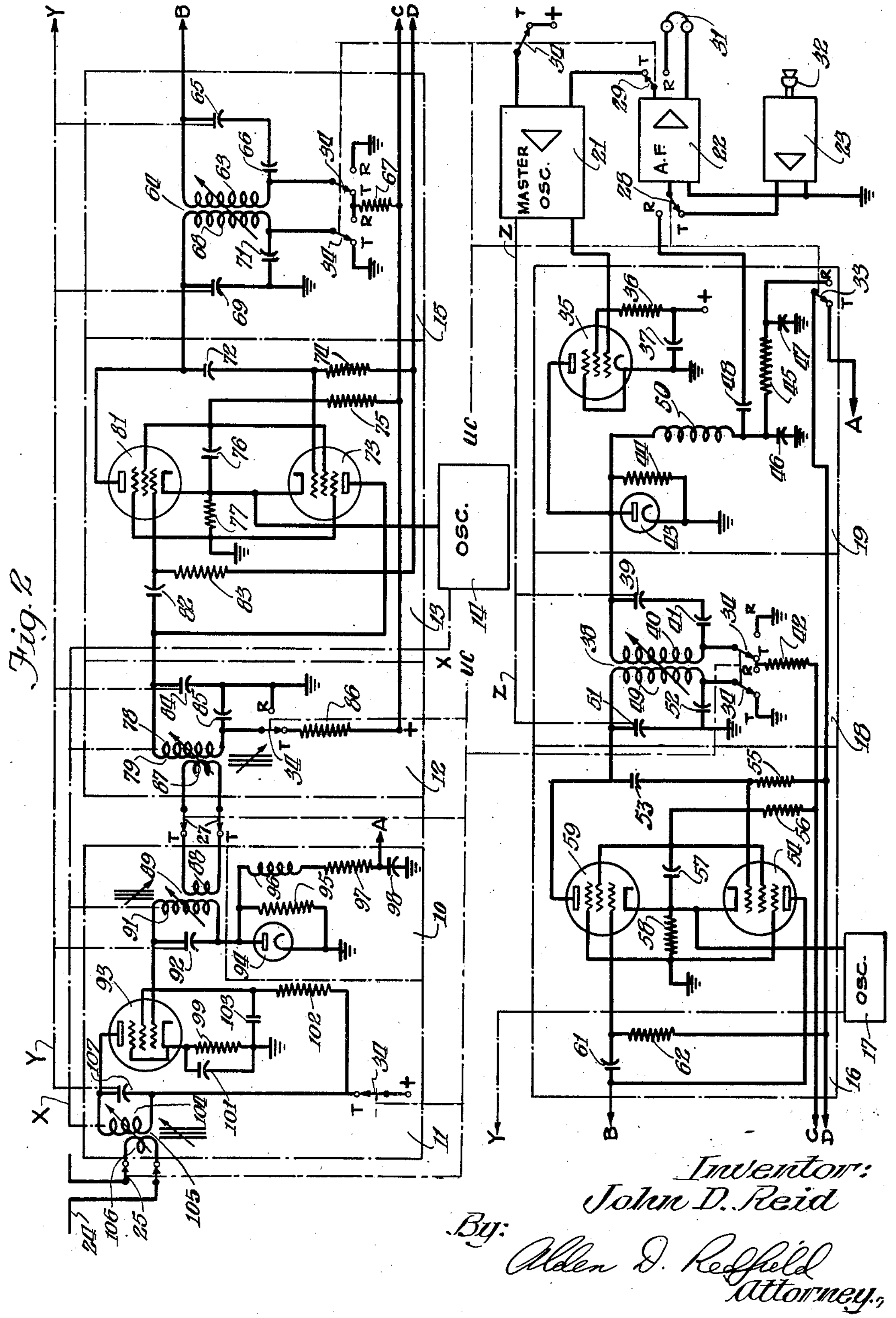
Figure 2 is a simplified diagram of the transceiver operating as a transmitter at a selected frequency.

To illustrate applicant's invention with the greatest possible clarity, circuit details have been shown in Figure 2 as the equivalent circuit would be when the apparatus is operating on a selected transmission frequency. The circuit shown, therefore, omits many of the details of the selector switches showing unicontrol action by schematic lines marked X, Y, Z, and UC. These are explained in part by a portion of the circuit shown in Figure 3.

Referring to Figure 2 the circuit elements employed in transmission now will be described. The microphone 32 connected to the amplifier 23 transmits audio-frequency energy to the audio-frequency amplifier 22 since all switches, including switch 28, have been moved to the transmit position. The output of the amplifier 22 has been connected through the switch 29 to the input of the master oscillator 21, which is supplied with anode potential by the closing of one of the switches 34. In Figure 1 a single switch 34 was shown since this represented the connection of anode potential to a particular group of tubes. In the circuit diagram of Figure 2 this single switch, for sake of clarity, has been replaced with a plurality of switches all identified as switch 34, since obviously a multiple pole double throw switch would constitute the equivalent of the switches indicated in the diagram.

The oscillator 21 is connected to the grid of a vacuum tube 35. Suitable screen grid potential is supplied through a resistor 36 which has one terminal connected to a capacitor 37, which is connected to the cathode and ground. The anode of the vacuum tube 35 is connected to one winding of a transformer 38, which is one of the principal components of the intermediate frequency transformer apparatus contained within rectangle 18. The winding of the transformer 38, which is connected to the anode of the vacuum tube 35 is tuned by a step adjusted capacitor 39 which is connected in series with another capacitor 41. The other terminal of the one winding 40 of the transformer 38 is connected through a switch 34 to the T or transmit contact, which in turn is connected through a resistor 42 to the conductor C.

The anode of the vacuum tube 59 during the time that it operates as a receiver, supplies radio frequency energy through the transformer 38 to a diode vacuum tube 43, which is connected in parallel with a resistor 44. The cathode of the diode 43 is connected to ground. The anode of the diode 43 is connected through an inductance or choke coil 50 to a filter network which includes a series resistor 45 having one terminal connected to the R contact of switch 33. Opposite ends of the resistor 45 are connected to grounded capacitors 46 and 47. For supplying audio-frequency energy when the vacuum tube 43 is used as a third detector, a coupling capacitor 48 is connected to the common juncture of the inductor 50 and the resistor 45. The capacitor 48 is connected to the R contact of switch 28 whereby energy may be supplied to the audio frequency amplifier 22 for reception purposes.

The other winding 49 of the transformer 38 is tuned by a step adjusted capacitor 51 connected through a series capacitor 52. The juncture between these capacitors is connected to ground. During the time that the transformer 38 is used as a transmitting transformer the capacitor 52 is effectively short circuited since the switch 34 has been moved to engage contact T which is connected to ground. One terminal of the transformer winding 49 is connected through a coupling capacitor 53 to the grid of a vacuum tube 54 contained within the rectangle 16. The grid of the vacuum tube 54 is connected to one terminal of the resistor 55, which is connected to the conductor D. The conductor D is connected through switch 33 to the contact T, which in turn is connected to a conductor A. The apparatus associated with conductor A subsequently will be described when the apparatus contained within the rectangle 11 is considered. Suitable screen grid voltage is supplied to the screen grid of the vacuum tube 54 through a resistor 56, which is connected to conductor C. A by-pass capacitor 57 is provided between the cathode and one terminal of the resistor 56. The cathode of the vacuum tube 54 is connected to receive energy from the oscillator 17. A suitable biasing potential is developed for the vacuum tube 54 by a cathode to ground resistor 58. The anode of the vacuum tube 54 is connected to conductor B, which extends to the transformer contained within the rectangle 15. Another vacuum tube 59 is also contained within the rectangle 16 for use during the time that the apparatus serves as a radio receiver. The cathode of the vacuum tube 59 is connected to the bias resistor 58. The screen grid is connected to one terminal of the resistor 56. The anode of the vacuum tube 59 is connected to the upper terminal of the winding 49 of the transformer 38. The grid of the vacuum tube 59 is coupled through a coupling capacitor 61 to the transformer contained within the rectangle 15. The grid of the vacuum tube 59 is also connected to a resistor 62, which has one terminal connected to the conductor D. The conductor B extending from the anode of the vacuum tube 54 is connected to one winding 63 of a transformer 64 contained within the rectangle 15. The winding 63 is tuned by an adjusted capacitor 65 connected in series with another capacitor 66. A lower terminal of the winding 63 of the transformer 64 is connected through the switch 34 to a resistor 67, which is connected to the conductor C. The other winding 68 of the transformer 64 is tuned by a step adjusted capacitor 69 connected through another capacitor 71 to the other terminal of the winding 68. The common juncture between the capacitor 69 and 71 is connected to ground. In the transmit connection one terminal of the transformer 68 is connected through the switch 34 to the contact T, which is grounded.

The upper terminal of the transformer winding 68 of the transformer 64 is connected through a coupling capacitor 72 to the grid of a vacuum tube 73 contained within the rectangle 13. The grid of the vacuum tube 73 is also connected through a resistor 74 to the conductor D. Suitable screen grid voltage is supplied through a resistor 75 connected to the conductor C. A bypass capacitor 76 is connected between the cathode and the screen grid. A suitable cathode biasing voltage is developed across a resistor 77 connected between ground and the cathode. The cathode is connected to receive energy from the oscillator 14. The anode of the vacuum tube 73 is connected to the winding 78 of a transformer 79 contained within the rectangle 12. The rectangle 13 also contains another vacuum tube 81 having its cathode connected to the biasing resistor 77. Screen grid voltage is supplied by a connection to the resistor 75. The anode of the vacuum tube 81 is connected directly to the winding 68 of the transformer 64. The grid of the vacuum tube 81 is coupled through a capacitor 82 to the upper terminal of the winding 78 of the transformer 79. The grid of the vacuum tube 81 is also connected through a resistor 83 to the conductor D.

The winding 78 of the transformer 79 is tuned by a step adjusted capacitor 84 connected to another capacitor 85. The two capacitors 84 and 85 are arranged in series across the windings 78 of the transformer 79. The common juncture between these capacitors is connected to ground and to the contact R of a switch 34. The juncture between the capacitor 85 and the lower terminal of the winding 78 is connected to the movable contact of a switch 34, which is connected to a contact T connected through a resistor 86 to the conductor C. The other winding 87 of the transformer 79 is connected through the switch 27 to a winding 88 of a transformer 89 contained within the rectangle 11. The other winding 91 of the transformer 89 is tuned to a step adjusted capacitor 92. The upper terminal of the transformer winding 91 is connected to the grid of a vacuum tube 93. The lower terminal of the winding 91 is connected to a diode 94, which has its cathode connected to ground. The diode 94 is in parallel with a resistor 95. The anode of the diode 94 is connected to a series circuit including an inductor 96, a resistor 97 and a capacitor 98, which is connected to ground. The juncture between the resistor 97 and the capacitor 98 is connected to the conductor A, which it will be recalled is connected through the switch 33 to the conductor D. The diode 94 is provided to develop an automatic gain control voltage suitable for controlling the preceding amplifier tubes in accordance with the desired gain characteristic for transmission operation. Gain control voltage, therefore, is supplied through the resistor 55 to the grid of the vacuum tube 54 and through the resistor 74 to the grid of the vacuum tube 73.

The cathode of the vacuum tube 93 is connected through a biasing resistor 99 to ground. This resistor 99 is connected in parallel with the by-pass capacitor 101. Suitable screen grid voltage is provided from the switch 34, which is connected to the T terminal, through a resistor 102, which is connected to a grounded by-pass capacitor 103. The anode of the vacuum tube 93 is connected to the winding 104 of a transformer 105 having its other winding 106 connected through the switch 25 to the dipole antenna 24. The winding 104 of the transformer 105 is tuned by an adjusted capacitor 107. The remaining terminal of the winding 104 is connected to the T contact of the switch 34 so that anode potential is supplied to the vacuum tube 93.

It will be recalled that in the operation of the system as shown in Figure 1, the radio-frequency power amplifier 11, the signal amplifier 12 and the oscillator 14 were simultaneously adjusted so as to change the operating frequency by equal increments of 1 megacycle. In the example selected seven steps were indicated and these were accomplished by the unitary control identified as control X. For the purpose of explaining this operation it may be assumed that this control X is arranged to produce certain changes in various inductors such as the winding 104 of the transformer 105, the winding 91 of the transformer 89 and the winding 78 of the transformer 79. In addition, the control X also produces a change in the operating frequency of the oscillator 14. For the frequencies suggested for the operation of each of the units in Figure 1, the oscillator frequency, therefore, is changed by one megacycle steps through the range of 21 to 27 megacycles. It is also stated that additional tuning means were provided for the radio frequency power amplifier 11 and the signal amplifier 12 for producing ten steps in a higher order of frequency. These ten steps were accomplished by manipulation of another unitary control identified by the letter Y, which also produced frequency changes in the oscillator 17 and the intermediate frequency transformer 15. Accordingly ten different adjusted capacitors or mechanical means to move a variable capacitor to predetermined positions are provided for each of the windings 104, 91, 78, 68 and 63.

The intermediate frequency transformer contained within the rectangle 18 is also arranged to be tuned in ten equal increments and hence, this may be accomplished by a step adjusted capacitor connected in parallel with the windings 40 and 49 of the transformer 38. The control for changing from one adjusted capacitor to another is indicated by the unitary control Z, which is connected to provide ten equal changes in the operating frequencies of the master oscillator 21.

To illustrate still further the operation of the system shown in Figure 2, it may be assumed that the master oscillator 21 is set to generate the frequency of 900 kilocycles. Audio-frequency modulates this frequency within a range of ±five kilocycles, which is transmitted through the vacuum tube 35 to the intermediate frequency transformer 38. Due to the unitary control Z, this transformer has been tuned to pass 900 kilocycles. The 900 kilocycle energy reaches the mixer tube 54 which also receives energy from the oscillator 17. It will be recalled that the oscillator frequency range was given as 19.9 to 19.0 megacycles, which is in the inverse order of the frequency range given for all other components of the system. Thus in Figure 4 it may be assumed that the first button "00" in column Z was actuated to set the master oscillator at 900 kilocycles. It now may be assumed that control Y had its first button "0" pushed, which should set the oscillator 17 at 19.9 megacycles. Thus the resultant output of the mixer tube 54 would be 19.0 megacycles. This is transmitted through the intermediate frequency transformer 64, which is impressed upon the grid of the vacuum tube 73. The oscillator 14 also supplies energy to the mixer tube 73 and it now may be assumed that the first button "2" in column X of Figure 4 has been actuated. Thus the oscillator 14 will be operating at 21 megacycles, which when combined with the 19 megacycle energy will produce a resultant of two megacycles. Since both controls X and Y determine the operating frequencies of the signal amplifier 12 and the radio frequency amplifier 11, the transmitted frequency will be 2.0 megacycles.

Let it now be assumed in Figure 4 that the first push-button in column X and the last push-buttons in columns Y and Z have been actuated. Thus the master oscillator which supplies energy of 990 kilocycles, which would be combined with 19 megacycles energy from the oscillator 17 which produces a resultant frequency of 18.010 megacycles, which subsequently is combined with 21 megacycle energy from the oscillator 14 to produce a resultant frequency of 2.990 megacycles transmitted by the signal amplifier 12 and the radio frequency amplifier 11.

To illustrate still further the operation, let it be assumed in Figure 4 that the last push-button "8" in column X and the first push-buttons "0" and "00" in columns Y and Z had been actuated. Thus again the master oscillator produces a frequency of 900 kilocycles, which in tube 54 is combined with energy from the oscillator 17 of a frequency of 19.9 megacycles producing a resultant of 19 megacycles which then will be combined in tube 73 with energy from the oscillator 14 having a frequency of 27 megacycles. This produces a resultant frequency of eight megacycles.

If, however, in Figure 4 the last push-buttons "8," "9" and 90 in columns X, Y and Z were actuated, the master oscillator would supply energy of 990 kilocycles, which would be combined in vacuum tube 54 with energy of a frequency of 19 megacycles giving a resultant of 18.010 megacycles. This would be combined in heterodyne tube 73 with 27 megacycle energy from the oscillator 14 to produce a resultant frequency of 8.990 megacycles, which is substantially the upper limit of nine megacycles given as the upper frequency of the signal amplifier 12 and the radio frequency amplifier 11.

From the foregoing examples it readily will be appreciated that any one of 700 channels between 2.0 and 8.990 megacycles may be obtained by manipulation of the 27 push-buttons contained in columns X, Y and Z of Figure 4. These buttons give a direct reading in frequency.

To illustrate the manner in which two sets of controls may be applied to the power amplifier 11 and the signal amplifier 12 to produce a total of 70 changes in frequency, a portion of the power amplifier 11 has been shown in Figure 3. It will be recalled that the control X was designed to produce seven equal changes in the frequency of the amplifier 11. Within each of these frequency changes still further changes of a higher order were to be obtained through actuation of control Y, which provided ten equal steps. In the preceding description it was stated that in the signal amplifier and in the power amplifier both inductive and capacitive tuning means were provided, one of which was adjustable in seven steps and the other of which was adjustable in ten steps. Thus in Figure 3 the winding 104 of the transformer 105 has been shown as having seven taps to provide the seven major frequency changes. Likewise the winding 91 of the transformer 89 is provided with seven taps. Selective connections to these taps are made by means of the control X. Thus each of the push-buttons in the column X of Figure 4 is arranged to control corresponding taps on the transformer windings 104, 91 and 78. In the circuit shown in Figure 2 it was stated that the transformer winding 104 was adjusted in frequency by a step adjustable capacitor 107 and likewise the winding 91 was adjusted in frequency by a step adjustable capacitor 92. From Figure 3 it will be appreciated that the capacitors 107 and 92 could be replaced by ten different capacitors arranged to be selectively connected to their associated windings. The control Y also produced a change in the effective capacity associated with the winding 78 of the transformer 79 and the capacities associated with the windings 63 and 68 of transformer 64. These controls are all manipulated by actuation of any one of ten push-buttons in column Y of Figure 4.

It will be apparent that each of the oscillators 14 and 17 are provided with selectively actuated tuning means in order to produce the desired frequency changes. Each of the oscillators may be either crystal controlled or arranged to be compensating for over-all stability. Further details and explanation of the operation of such contemplated arrangements are given in my Patent No. 2,507,576, granted May 16, 1950, for improvements in Push-Button Tuner for Radio Receivers, assigned to the assignee of this application. The tuning means provided for the oscillators might be inductive, capacitive or by piezo electric crystals. Obviously the combinations of inductance and capacitance might be provided to produce the desired frequency change in any of the components which are to be tuned by steps. It also will be appreciated that where column X of Figure 4 is provided with ten push-buttons, each providing an equal change in frequency, that a total of 1,000 channels could be selected, each having 10 kilocycle separation from the adjacent channels.

T and R buttons are also provided in Figure 4 and these constitute the W control shown in Figure 1. Certain of the components are used both for transmission and reception as will be apparent from the description of the operation of the transformer 64 when the apparatus is used for reception. In that case the switch blades 34 shown within rectangle 15 are connected to their respective R contacts. Thus incoming energy is impressed upon the grid of the vacuum tube 81, which has its anode connected to the upper terminal of the winding 68 of the transformer 64. The lower terminal of the winding 68 is now connected to a source of anode potential through the resistor 67. The lower terminal of the winding 63 of the transformer 64 is now connected to ground. Energy from the upper terminal of the transformer 63 is transmitted through the coupling capacitor 61 of rectangle 16 to the grid of vacuum tube 59. Since the switch 34 of rectangle 15 has been moved from the T contact to the R contact the anode of vacuum tube 54 is now at substantially ground potential and hence only the vacuum tube 59 is in operation because it is receiving anode potential through the winding 49 of transformer 38 since switch 34 is connected to the R terminal, which is connected to the resistor 42 of the potential conductor C. In the receiving position a portion of the energy transmitted by the transformer 38 is now applied to the diode 43, which develops a gain control voltage which is filtered by the network including the resistor 45. This gain control voltage is then applied through the switch 33 so that a certain bias potential is applied through the resistor 62 to the grid of the vacuum tube 59 and through the resistor 83 to the grid of the vacuum tube 81.

It will further be appreciated that while the master oscillator 21 and the intermediate frequency stage 18 have been shown as provided with ten steps to produce frequency changes that a greater or lesser number of steps could be provided. Thus in the present case, if twenty steps were provided for these elements so as to produce five kilocycle separation between channels, ten additional buttons would be required in column Z to produce a total of 1400 possible channel selections. Therefore, it is apparent that only equal incremental changes are necessary for these adjustments. The incremental changes provided for the oscillators 17 and 14 are arranged in decimal increments so that the change produced by each increment is ten times as great as the frequency change produced by the preceding incremental change. Thus the master oscillator in the present example is adjusted by ten kilocycle intervals, the oscillator 17 by 100 kilocycle intervals and the oscillator 14 by one megacycle intervals. It is, therefore, apparent that an additional decimal series of 1 kilocycle steps could be added by affording a step adjustable control for the master oscillator 21 and the intermediate frequency amplifier 18 which would produce frequency variations in steps of 1 kilocycle. This would provide a choice of 7000 discrete steps of 1 kilocycle each from 2.000 to 8.999 megacycles.

It is further contemplated that instead of employing the single intermediate frequency transformer for each of the units or rectangles 15 and 18, a plurality of intermediate frequency transformers might be utilized, if additional amplification were needed, since then additional transmitting and amplifier tubes could be provided. In each such amplifier stage the transmitting and amplifying tubes would be connected back to back as illustrated in Figure 2 in the rectangles 13 and 16 so that they might be controlled by control W to determine whether the transmitting or receiving tubes were to be placed in operation.

When the circuit shown in Figure 2 is employed for reception, the antenna 24 is connected to the input winding 87 of the transformer 79 of the signal amplifier 12. Since the switches 34 have been thrown to the R terminals, anode potential is now being supplied to the vacuum tubes 81 and 59. One of the switch blades 34 has connected the lower terminal of the transformer winding 78 to ground. Thus radio frequency energy appearing across this transformer winding is impressed between ground and the grid of the vacuum tube 81. The anode of the vacuum tube 81 is connected to supply radio frequency energy through the transformer 64 to the grid of the vacuum tube 59. The anode of the vacuum tube 59 supplies radio frequency energy through the transformer 38 to the diode rectifier 43. The rectified energy produced by the diode 43 is impressed across the circuit comprising the inductor 50 and the capacitor 46. The common juncture between these elements is connected to a coupling capacitor 48, which is connected to the terminal R of the switch 28, which is connected to the input of the audio-frequency amplifier 22. The output of this amplifier is connected through the switch 29 to the reproducer or headphones 31.

A portion of the rectified energy produced by the diode 43 serves as a gain control voltage, which is applied through the switch 33 to the grid of the vacuum tubes 59 and 81. This gain control voltage is suitably filtered by the network comprising the resistor 45 having its ends connected to grounded capacitors 46 and 47. It will be noted that the actuation of the gang switch 34 from the transmit position to the receive position has removed the anode or power potential for the master oscillator 21. This switch also has opened the anode potential to the power amplifier tube 93. Likewise no anode potential is supplied to the vacuum tubes 73 and 54.

It is believed that from the brief description of the operation of the apparatus in receiving condition that those skilled in the art will readily appreciate that the present system makes it possible to rapidly and accurately shift from a transmitting operation to a receiving operation at any selected frequency. Quite obviously transmission may take place on one channel and reception on a different channel. Reception also is possible on the same channel as the transmitting channel since there is no interference between the transmitter and the receiver as might be the case in more conventional arrangements where the transmitter is not deenergized during receiving periods.

While for the purpose of illustrating and describing the present invention certain circuit arrangements have been shown in the drawing, it is to be understood that the invention is not to be limited thereby since such variations and additions are contemplated as may be commensurate with the spirit and scope of the invention as set forth in the accompanying claim.

I claim:

In a radio transceiver arranged for transmission and reception of signals over carrier waves of the same frequency the combination comprising antenna terminals, a radio frequency amplifier having tuned input and output circuits; a first and second mixer stage, each of said stages comprising an adjustable frequency oscillator, a transmit tube and a receiving tube each having input and output circuits and each tube having a similarly functioning modulating electrode coupled to said oscillator, a first tuned circuit coupled into the input of said receiving tube and into the output of said transmit tube, a second tuned circuit coupled into the input of said transmit tube and into the output of said receiving tube; the second tuned circuit in said first mixer stage being magnetically coupled to the first tuned circuit in second mixer stage, a modulator-transducer transmitting stage including an adjustable master oscillator; a receiving detector-transducer stage; a third tuned circuit magnetically coupled to the second tuned circuit in said second mixer stage and connected in common to said modulator-transducer and detector-transducer stages; a transmit-receive switch having a transmit switch position for completing a signal path between the modulator-transducer stage and antenna terminals through said third tuned circuit and the transmit tubes in said second and first mixer stages, and having a receive switch position for completing a signal path between said antenna terminals and said detector-transducer stage through said first and second mixer stages and said third tuned circuit; a first unicontrol for tuning the radio frequency amplifier tuned input and output circuits and for tuning the first mixer stage oscillator and first tuned circuit in given frequency steps; a second unicontrol for tuning the radio frequency amplifier tuned input and output circuits, the first tuned circuit in both mixer stages and the second tuned circuit in the first mixer stage in decimal increments of said given frequency; a third unicontrol for tuning the third tuned circuit and the second mixer stage tuned circuit magnetically coupled thereto along with said master oscillator in decimal frequency increments of second unicontrol frequency steps.

References Cited in the file of this patent

UNITED STATES PATENTS

| Number | Name | Date |
|---|---|---|
| 1,361,488 | Osborne | Dec. 7, 1920 |
| 2,032,675 | Waller | Mar. 3, 1936 |
| 2,131,558 | Granger | Sept. 27, 1938 |
| 2,265,083 | Peterson | Dec. 2, 1941 |
| 2,354,148 | Shaw | July 18, 1944 |
| 2,380,288 | Bligh | July 10, 1945 |
| 2,419,593 | Robinson | Apr. 29, 1947 |
| 2,447,392 | Byrne | Aug. 17, 1948 |
| 2,447,490 | Collins | Aug. 24, 1948 |
| 2,487,857 | Davis | Nov. 15, 1949 |
| 2,505,754 | Combs | May 2, 1950 |
| 2,527,125 | Giacoletto | Oct. 24, 1950 |
| 2,529,550 | Harris | Nov. 14, 1950 |
| 2,539,537 | Harley et al. | Jan. 30, 1951 |